United States Patent [19]

Kamatani

[11] Patent Number: 5,577,148
[45] Date of Patent: Nov. 19, 1996

[54] LASER SCANNING APPARATUS WITH INTERACTIVE OPTICAL SIGNAL TRANSMITTING UNIT

[76] Inventor: Yasuo Kamatani, 2-12-2 Yokoyama, Sagamihara-shi, Kanagawa 229, Japan

[21] Appl. No.: 384,746

[22] Filed: Feb. 7, 1995

[51] Int. Cl.⁶ .................. G02B 6/04; H04N 7/14
[52] U.S. Cl. .................. 385/115; 348/13; 348/164; 348/197
[58] Field of Search .................. 385/115–121; 359/196, 197, 223; 348/13, 98, 106, 164, 166–168, 197, 804; 128/6

[56] References Cited

U.S. PATENT DOCUMENTS

| | | | |
|---|---|---|---|
| 3,892,468 | 7/1975 | Duguay | 385/115 X |
| 4,930,849 | 6/1990 | Tanaka | 385/115 X |
| 4,938,205 | 7/1990 | Nudelman | 128/6 |
| 5,172,685 | 12/1992 | Nudelman | 128/6 |

Primary Examiner—John D. Lee

[57] ABSTRACT

A laser scanning apparatus having at least one light source which emits a light at selective intensity, a light scanning device to scan the light emitted from the light source, a waveguide bundle which receives the light at one end of the waveguide bundle and the other end of the waveguide bundle is aligned to form a displaying screen, a phosphor coating screen and a set of photo-detector array which can receive the light passing through each bundled waveguide path. A picture is created by the scanned emission of the light at the other end of the waveguide bundle, or by the scanned emission of a set of phosphor struck by the light. An interactive signal transmission is achieved by sending an optical signal into the other end of the waveguide bundle to let the photo-detector receive the optical signal, and by sending an optical signal from the light source to the other end of the waveguide bundle by way of the waveguide path to let an outer photo-detector receive the optical signal at the other end of the waveguide bundle.

18 Claims, 11 Drawing Sheets

LASER SCANNING APPARATUS WITH INTERACTIVE OPTICAL SIGNAL TRANSMITTING UNIT

BACKGROUND OF THE INVENTION

1. Field of the Invention

This invention relates in general to a structure of a novel laser scanning apparatus. More specifically, this invention relates to a laser scanning apparatus apparatus which also has an additional optical signal sending or receiving capability, not only an optical output function to visualize a picture as a display.

2. Description of the Prior Art

Conventionally, a CRT (Cathode Ray Tube) display and an LCD (Liquid Crystal Display) have been the most well known and popular display system for picture or video display. Both display systems are widely used for home-entertaining or computing systems.

However, as for the CRT display, the most serious disadvantage must be its thickness. Because of the limitation to deflect an electron beam emitted from an electron gun, it requires longer distance between a screen to the electron gun in order to display larger picture. Eventually, it sets a limit of the size of the display. In addition, to produce even more precise picture with high resolution, high definition TV system which has four times as much number of pixels as ordinal CRT television system has been proposed. However, this system also has a limit to scan the electron beam to vast number of pixels.

As for the LCD system, structural disadvantage sets a limit of the number of the pixels, which are controlled by transistors individually. That is why very large liquid crystal display has never provided yet. In addition, malfunctioning of the transistor could seriously reduce the manufacturing yield.

Various display systems are known which incorporate the capability for writing and pointing onto the CRT or LCD, along with a detector for sensing and encoding the location of the pen or finger of the operator. For example, touch-screen system cooperated with the addresser, central signal processing unit or interface is currently used for signal input and output device with television or computer. However, this prior-art system is capable to only recognize the location of the pen or finger, and unable to transmit complicated command or send signals by way of a central signal processing unit or an interface to linked optical fiber communication network.

Accordingly, it is desirable to provide a novel interactive display system which reduces thickness and weight, and produces high precision picture. Additionally, an interactive optical display system must be needed to accomplish broad interactive optical fiber communication network which may provide a lot of new services such as video-on-demand. The present invention will be able to provide an interactive flat all-optical display system which has great advantages and many applications for the advanced optical fiber communication network system in near coming future.

SUMMARY OF THE INVENTION

The present invention has for its object to provide a laser scanning system for the optical fiber communication network. Another significant object of the invention is to provide an all optical display which can be fabricated with the integration techniques to offer great advantage on manufacturing process.

The object of the present invention can be achieved by an interactive laser display system, the apparatus comprising: at least one light source which emits a light at selective intensity; a light scanning device to scan the light emitted from the light source; a waveguide bundle which receives the light at one end of the waveguide bundle and the other end of the waveguide bundle is aligned to form a displaying screen; a phosphor coating screen; and a photo-detector array which can receive the light passing through each of the bundled waveguide path. A picture is created by the scanned emission of the light at the other end of the waveguide bundle, or by the scanned emission of a set of phosphors struck by the light.

An interactive signal transmission is achieved by sending an optical signal into the other end of the waveguide bundle to let the photo-detector to receive the optical signal, and by sending an optical signal from the light source to the other end of the waveguide bundle by way of the waveguide path to let a outer photo-detector to receive the optical signal at the other end of the waveguide bundle.

As for an exemplified structure, three laser diodes emit three primary colors each at certain intensity to provide mixed and varied colors, then a laser scanning device such as a moving mirror or a set of optical switch array to scan laser beams to the one end of waveguide like an optical fiber or optical waveguide path. The end of waveguide must be bundled as many as number of pixels to let the other end compose display screen. Each of the other waveguide end must be bundled and aligned in a selective manner of shape or pitch. Then, a picture is created by the scanned emission of the laser at the other end of the waveguide.

For a fuller understanding of the nature and advantages of the present invention reference should be made to the following detailed description taken in conjunction with the accompanying drawings.

DETAILED DESCRIPTION OF THE PREFERRED EMBODIMENT

Embodiments of the present invention will be explained with reference to the drawings.

Figure 1:
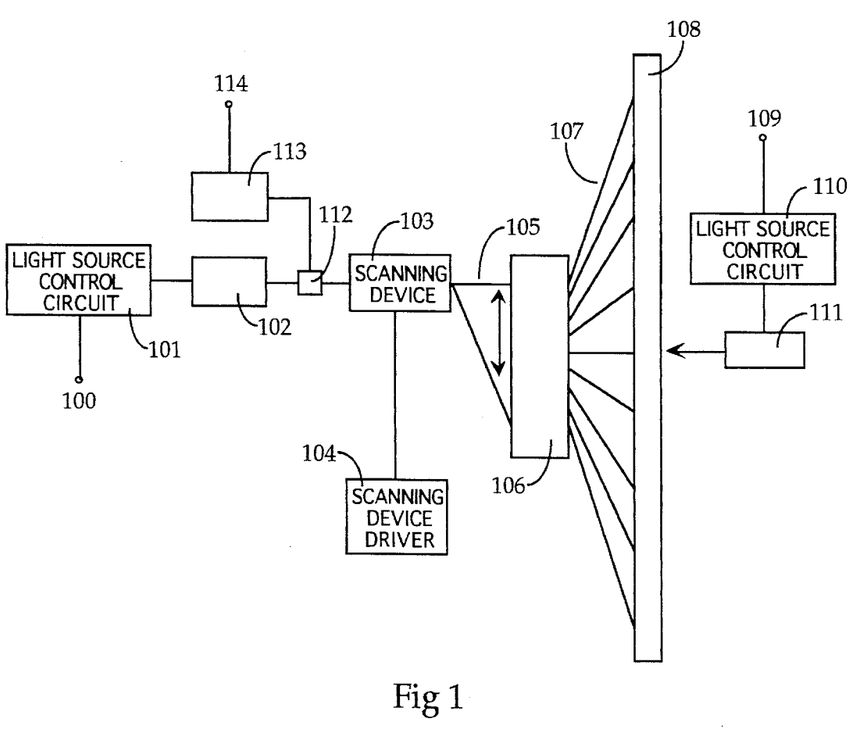
FIG. 1 shows schematic diagram of a laser scanning apparatus in a first fundamental embodiment according to the present invention.

FIG. 1 shows a schematic diagram of a fundamental embodiment of the laser scanning apparatus of the present invention. Associated with a video signal 100, a light source control circuit 101 modulates a light source 102. A light emitted from the light source 102 is scanned by a scanning device 103 which is driven by a scanning device driver 104 incorporated with a sweep signal, and a scanned light 105 is transmitted into a waveguide coupler 106. Aligned waveguide ends at the waveguide coupler 106 receive the light, then the light travels through a waveguide 107. At the another waveguide ends aligned over a screen 108, the scanned light emanated at each of the waveguide end creates a picture according to the video signal 100.

Associated with an input signal 109, a light source control circuit 110 modulates a light source 111. A light emitted from the light source 111 enters the other waveguide ends over the screen 108, and travels through waveguide path until the light is tapped by a waveguide coupler 112. The light is detected by photo-detector 113, and a signal 114 which is referential to the input signal 109 will be processed by further circuit such as a central processing unit.

A scanning device 103 plays an important role in this embodiment of the present invention. To scan the light and sweep into the end of bundled waveguide efficiently without loss of the light intensity, the combination of the scanning device and the bundled waveguide is particularly important.

Figure 2:
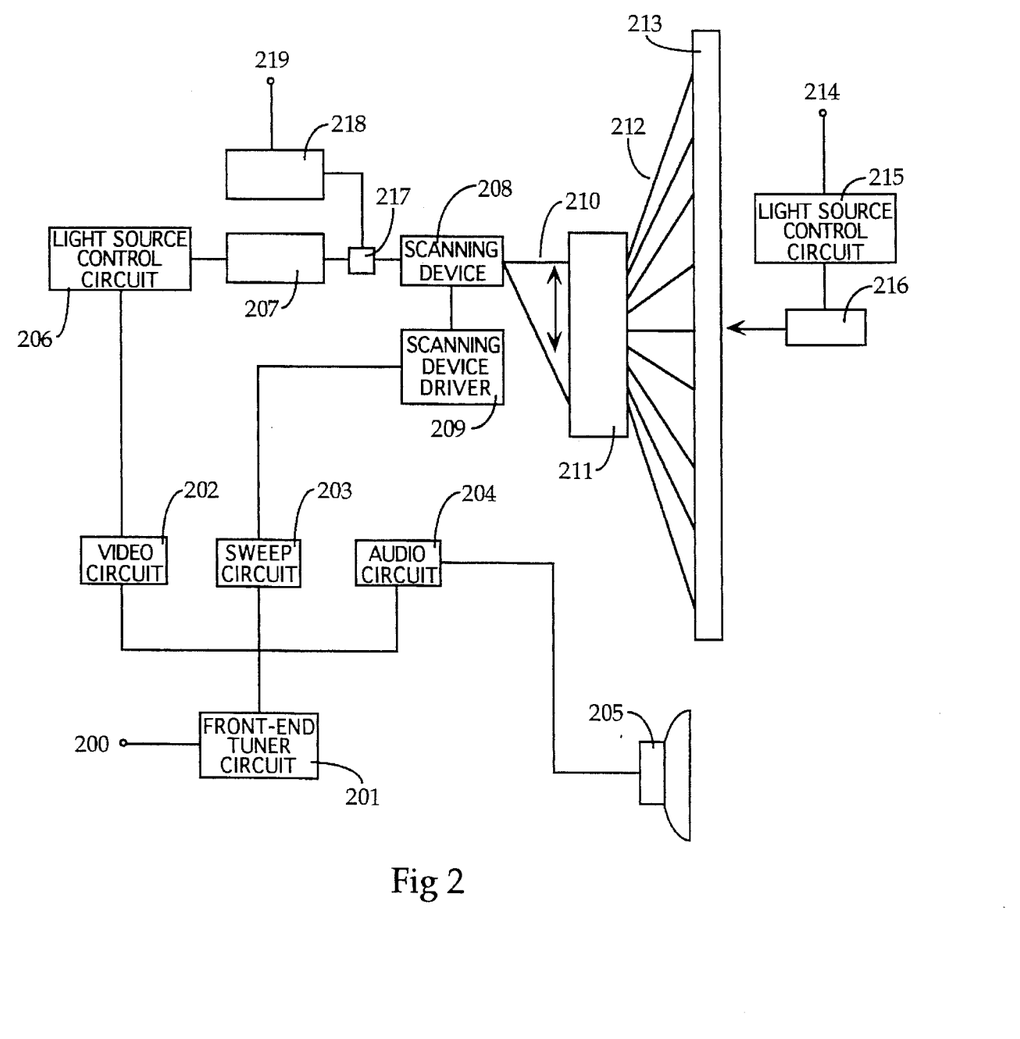
FIG. 2 shows schematic diagram of a laser scanning apparatus of the present invention, with receiving circuits for an application as a television system.

FIG. 2 shows schematic diagram of the laser scanning apparatus of the present invention, with receiving circuits for a practical application as a television system. Associated with a television signal 200, a front-end tuner circuit 201 delivers a video signal to a video circuit 202, a sweep signal to a sweep circuit 203 and an audio signal to an audio circuit 204. A speaker 205 operated by the audio circuit 204 reproduces sound according to the television signal 200. Then, a light source control circuit 206 modulates a light source 207. A light emitted from the light source 207 is scanned by a scanning device 208 which is driven by a scanning device driver 209 incorporated with the sweep circuit 203, and a scanned light 210 is transmitted into a waveguide coupler 211. Aligned waveguide ends at the waveguide coupler 211 receive the light, then the light travels through a waveguide 212. At the another waveguide ends aligned over a screen 213, the scanned light emanated at each of the waveguide end creates a picture according to the television signal 200.

Associated with an input signal 214, a light source control circuit 215 modulates a light source 216. A light emitted from the light source 216 enters the other waveguide ends over the screen 213, and travels through waveguide path until the light is tapped by a waveguide coupler 217. The light is detected by a photo-detector 218, and a signal 219 which is referential to the input signal 214 will be processed by further circuit such as a central processing unit.

Figure 3:
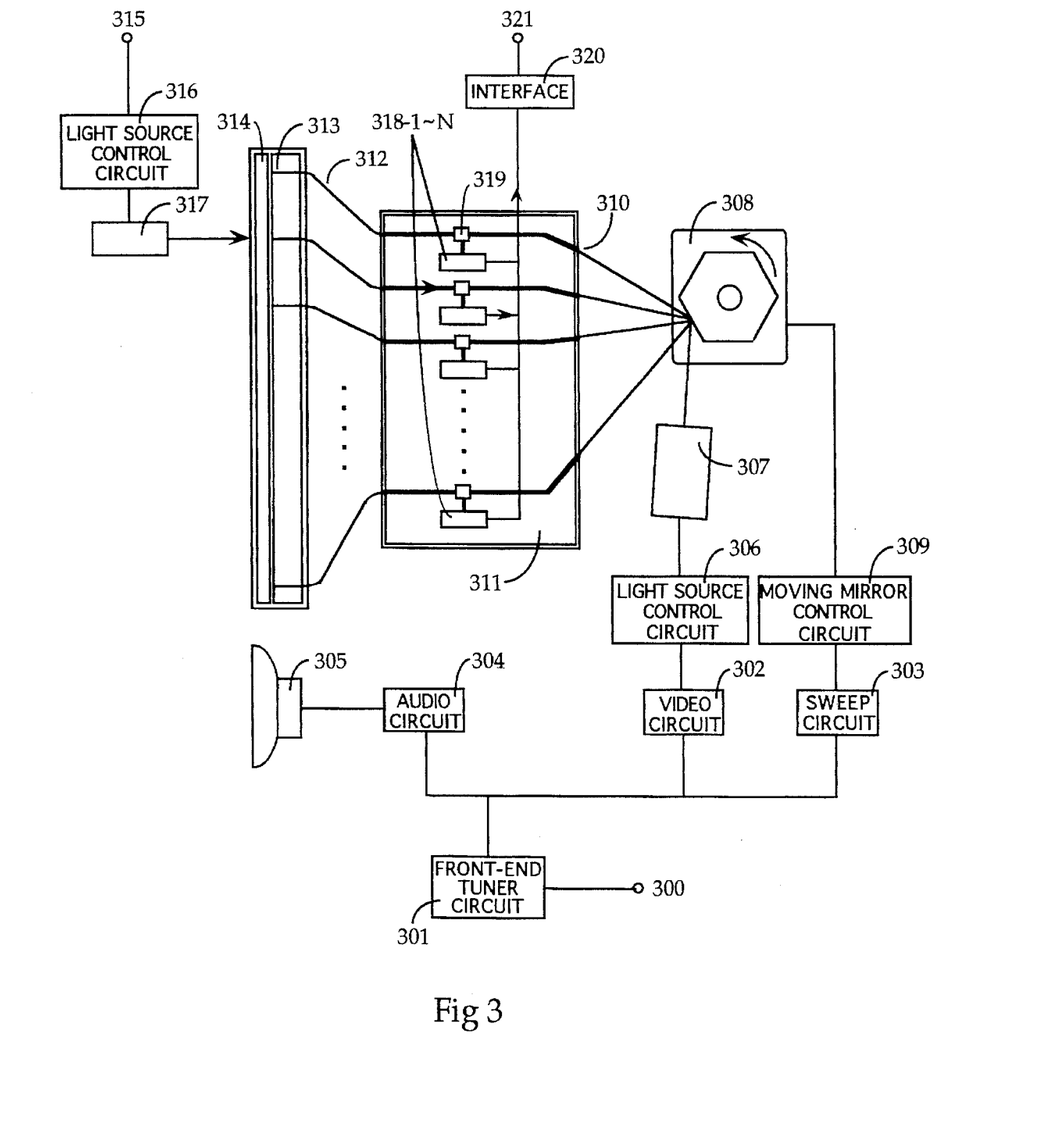
FIG. 3 is a perspective view of a laser scanning appartus structure in accordance with a preferred embodiment of picture displaying component of the present invention.

FIG. 3 is a perspective view of a laser scanning apparatus in accordance with a practical embodiment of picture displaying component of the present invention. Associated with a video signal 300, a light source control circuit 301 modulates a laser diode array 302. The laser diodes emit each of the three primary colors at certain intensity according to the video signal 300. The laser beams emitted from a laser diode array 302 are collimated by a lens 303 and a lens 304. Then the collimated laser beams are scanned by a moving mirror 305 which is driven by a driver incorporated with the sweep signal. The scanned laser beams are collimated by a lens 306 and transmitted into a waveguide coupler 307. Aligned waveguide ends at the waveguide coupler 307 receive the scanned laser beams, then the laser beams travel through a waveguide 308. At the other waveguide ends aligned over a screen 309, the scanned laser beams emanated at each of the waveguide end create a picture according to the video signal 300.

In this particular structure described in FIG. 3, only one moving mirror device scans a laser beam horizontally to sweep the laser beam into a horizontally aligned waveguide coupler. With two moving mirror devices, a laser beam can be scanned two-dimensionally to sweep the laser beam into a two-dimensionally aligned waveguide coupler which has squared surface of waveguide ends array. However, the structure with two moving mirror devices may require complicated driving circuit in order to sweep the laser beam precisely into a certain waveguide end. That structure may interfere the reliability and the thickness reduction of the display. By using the bundled waveguide device, the single dimensional scanning of the laser beam can visualize a two-dimensional or even three-dimensional picture efficiently and reliably.

Figure 4:
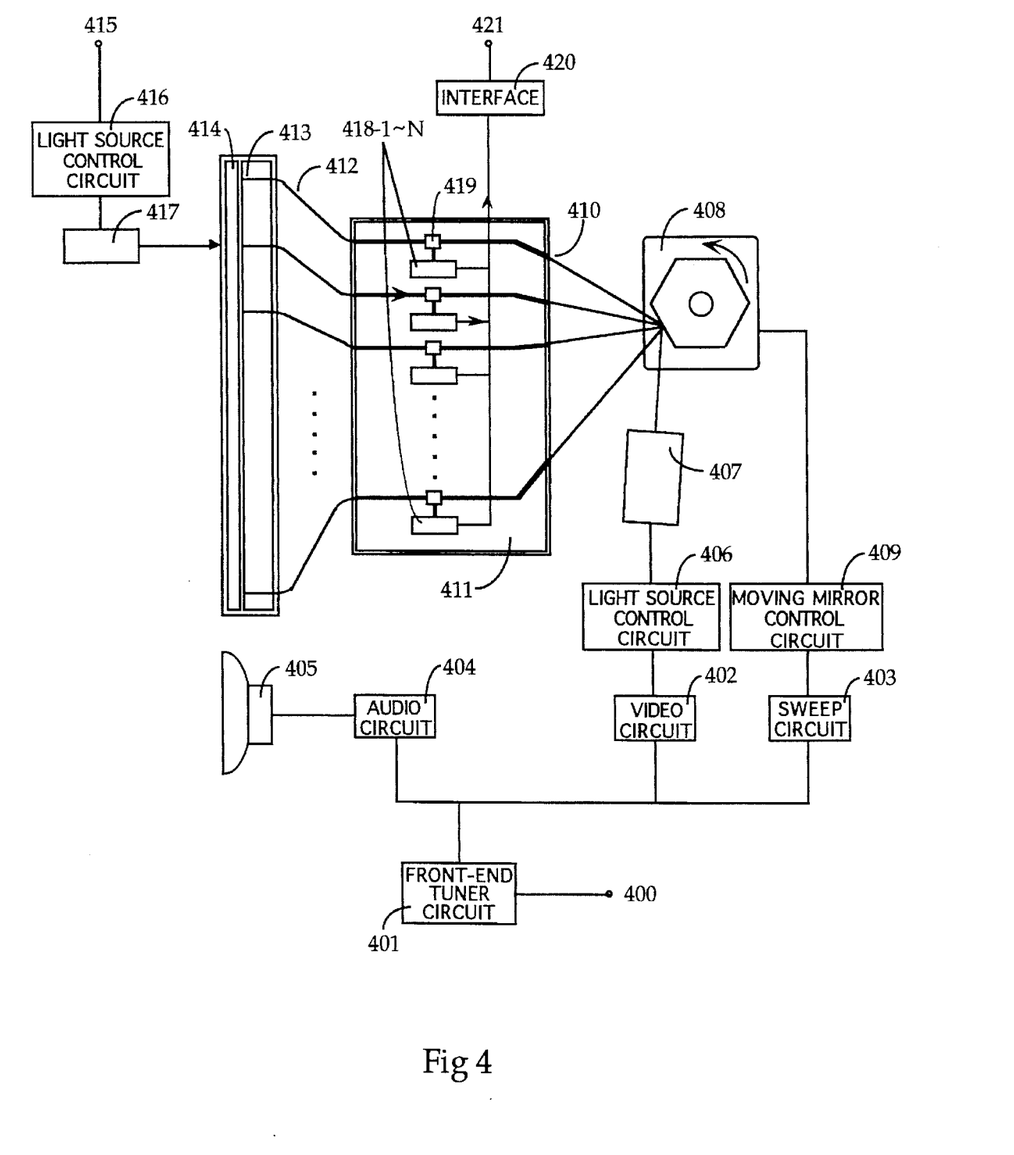
FIG. 4 is a perspective view of a laser scanning apparatus structure of the present invention in accordance with an another preferred embodiment of picture displaying component with receiving circuits.

FIG. 4 is a perspective view of a laser scanning apparatus of the present invention in accordance with an another practical embodiment of picture displaying component with television signal receiving circuits. Associated with a television signal 400, a front-end tuner circuit 401 delivers a video signal to a video circuit 402, a sweep signal to a sweep circuit 403 and an audio signal to an audio circuit 404. A speaker 405 operated by the audio circuit 404 reproduces sound according to the television signal 400. Then, a light source control circuit 406 modulates a laser diode 407. The laser diode 407 emits a laser beam at certain intensity. The laser beam emitted from the laser diode 407 is scanned by a moving mirror 408 which is driven by a moving mirror control circuit 409 incorporated with the sweep circuit 403, and a scanned laser beam is transmitted into a waveguide end 410. Each of the waveguide end is aligned and fabricated on integrated waveguide coupler 411 to receive the laser, then the laser travels through a waveguide 412. At the other waveguide ends aligned as a waveguide bundle 413, the scanned laser emanated at each of the waveguide end strikes a phosphor on a phosphor screen 414. Then the grow of the phosphors on a phosphor coating screen 414 create a picture according to the television signal 400.

Associated with an input signal 415, a light source control circuit 416 modulates a light source 417. A light emitted from a light source 417 enters the other ends of the waveguide bundle 413 by passing through the phosphor screen 414, and travels through the waveguide 412 until the light is tapped by a waveguide coupler 419. The light is detected by photo-detector 418-1~N, and a signal which is referential to the input signal 415 is processed by an interface 420 to send a output signal 421 to a further circuit such as a central processing unit. Wherein N is an integer greater than 1.

In this particular structure described in FIG. 4, the grow of the phosphor struck by the laser beam visualizes a picture. With the structure described in FIG. 3, the light emanated at the ends of the waveguide directly create a picture. In comparison between these two structure, the structure in FIG. 4 can display relatively clear picture, but it requires three primary color light sources in order to create full-color picture. The picture visualized by the emission of the phosphors may not be as precise as the picture visualized by the direct emanation of the light. In addition, this particular structure described in FIG. 4 requires three times as much waveguide path in the waveguide bundle to grow the phosphor which emits red, green and blue color.

Figure 5:
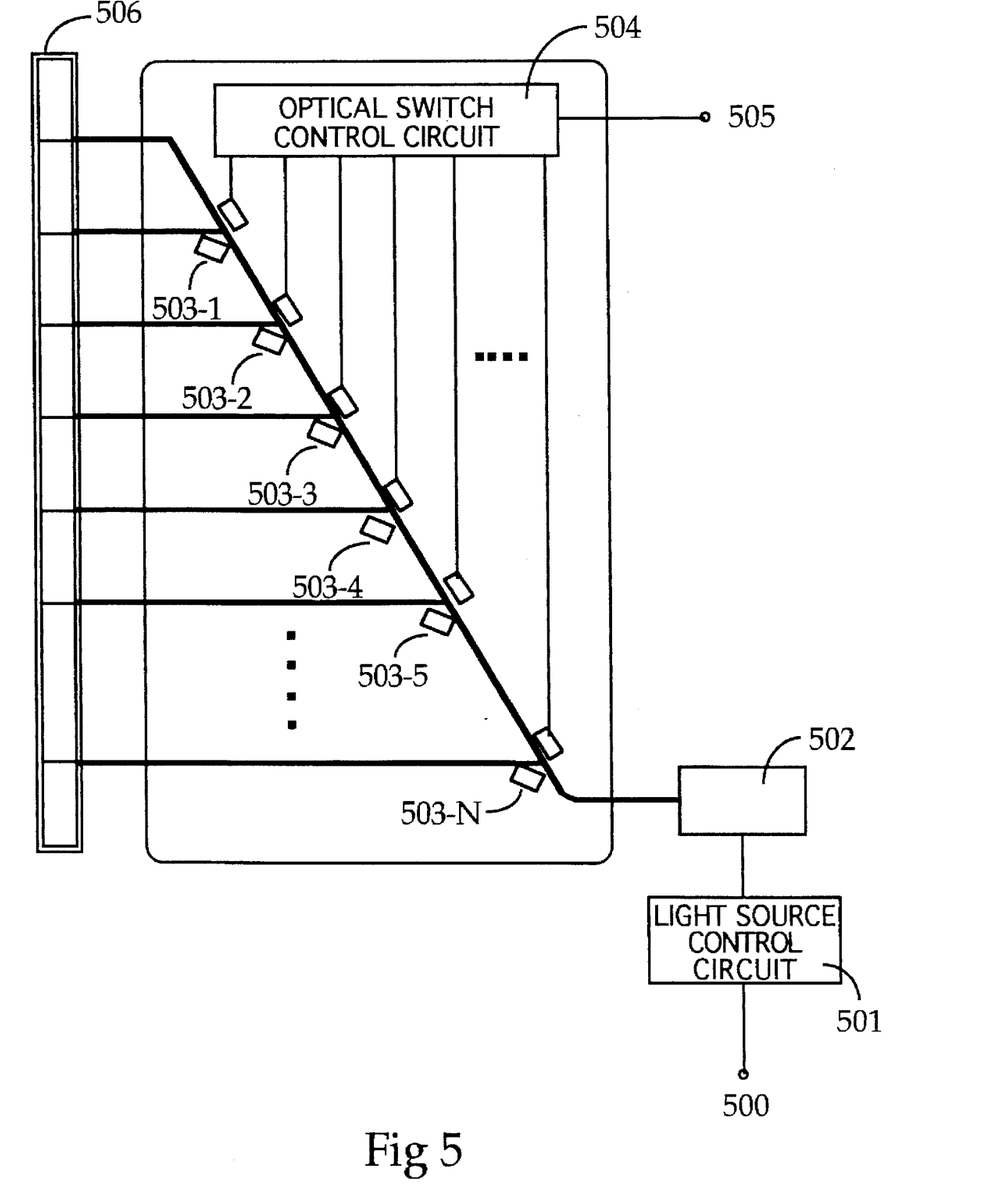
FIG. 5 is a perspective view of a laser scanning appartus structure in accordance with an another preferred embodiment of picture displaying component of the present invention.

FIG. 5 is a perspective view of a laser scanning apparatus in accordance with an another practical embodiment of picture displaying component of the present invention. Associated with a video signal 500, a light source control circuit 501 modulates a LED (light emitting diode) array 502. Each of the LED emits each of three primary colors at certain intensity according to the video signal 500. The lights emitted from a LED array 502 travel through a waveguide. Then at one of an optical switch 503-1~N, the lights are switched into a linked waveguide. Wherein N is an integer greater than 1. Each of the optical switch 503-1~N is driven by an optical switch control circuit 504 incorporated with a sweep signal 505. Only where the optical switch is "ON" the lights are deflected to the linked waveguide. By intermittently turning on and off the optical switch 503-1~N by the optical switch control circuit 504, the lights are swept into the each ramified waveguide. At the waveguide ends aligned over a screen 506, the swept lights emanated at each of the waveguide end bundle create a picture according to the video signal 500.

In this particular structure described in FIG. 5, all of the device can be integrated and the light does not have to travel off air. The light is confined in the waveguide. That is why the in-coherent light source such as a light emitting diode can be used as a light source.

Figure 6:
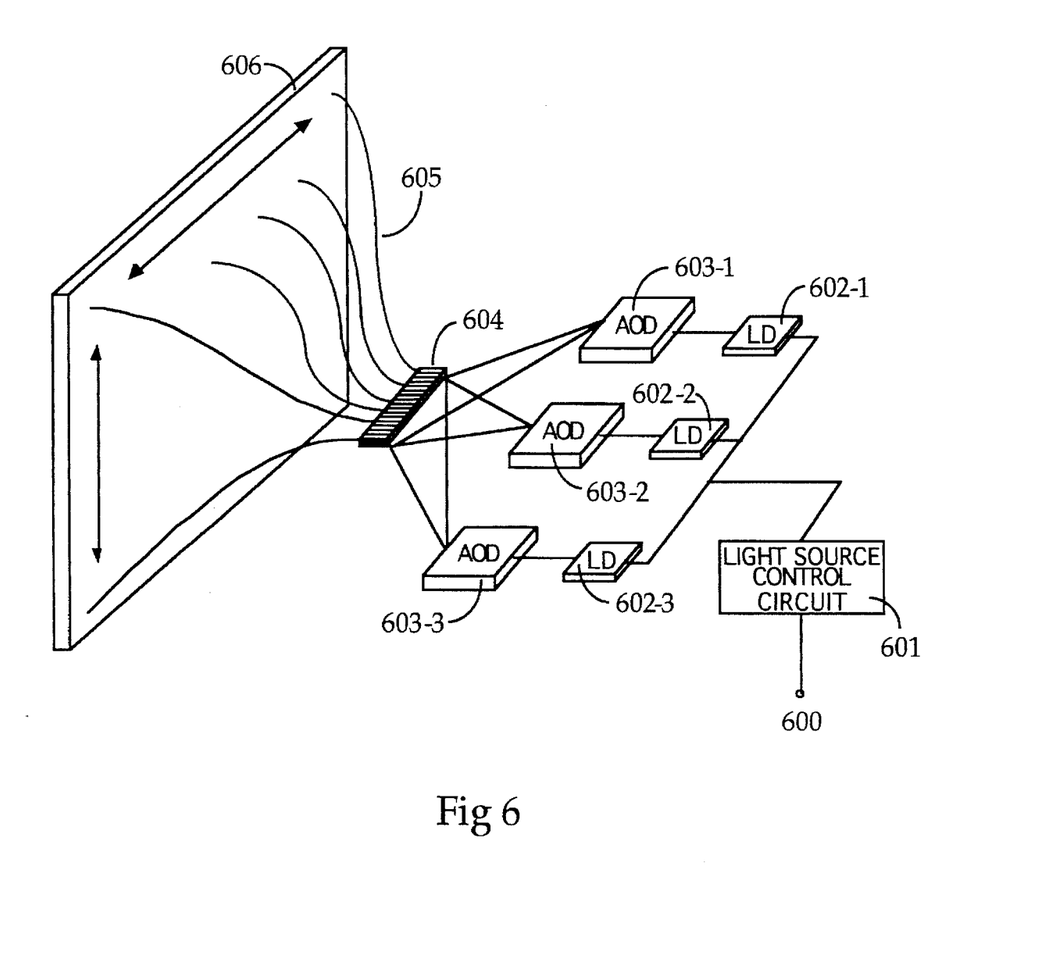
FIG. 6 is a perspective view of a laser scanning apparatus structure in accordance with an another preferred embodiment of picture displaying component of the present invention.

FIG. 6 is a perspective view of a laser scanning apparatus in accordance with an another practical embodiment of picture displaying component of the present invention. Associated with a video signal 600, a light source control circuit 601 modulates a laser diode 602-1~3. Each of the laser diode emits each of three primary colors at certain intensity according to the video signal 600. Each of the laser beam emitted from a laser diode 602-1~3 is scanned by an AOD (acousto-optic deflector) 603-1~3 which is driven by a driver incorporated with the sweep signal. All of the scanned laser beams are transmitted into a waveguide coupler 604. Aligned waveguide ends at the waveguide coupler 604 receive the scanned laser beams, then the laser beams travel through a waveguide 605. At the other bundled waveguide ends aligned over a screen 606, the scanned laser beams emanated at each of the waveguide end create a picture according to the video signal 600.

Figure 7:
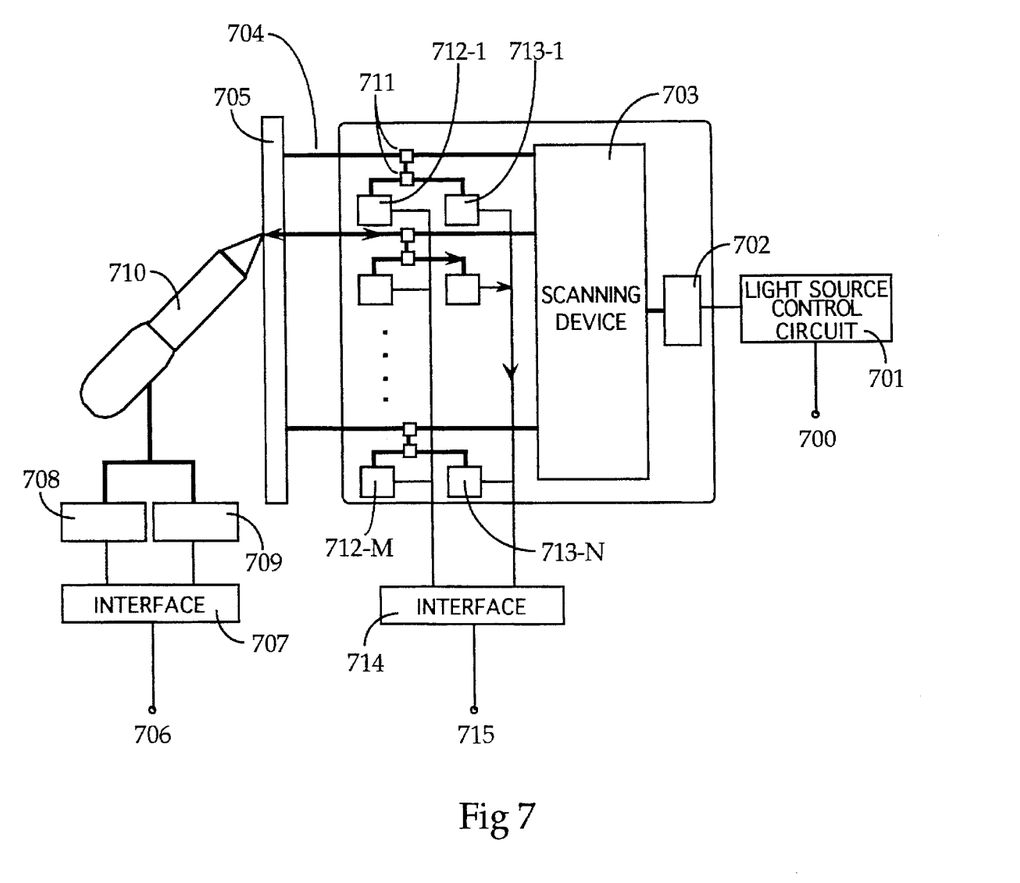
FIG. 7 shows schematic diagram of a laser scanning apparatus with optical signal input components for an application as an interactive display system of the present invention.

FIG. 7 shows schematic diagram of a laser scanning apparatus with optical signal input components for a practical application as an interactive display system of the present invention. Associated with a video signal 700, a light source control circuit 701 modulates a light source 702. Lights emitted from the light source 702 are scanned by a scanning device 703 which is driven by a scanning device driver incorporated with a sweep signal, and the scanned lights are transmitted into a waveguide 704, then the lights travel through the waveguide 704. At the other waveguide ends aligned over a screen 705, the scanned lights emanated at each of the waveguide end create a picture according to the video signal 700.

Associated with an input signal of an interactive signal 706, an interface 707 modulates a light source 708. A light emitted from a light source 708 is transmitted through a waveguide inside of a pen-shaped handle 710 and enters the other end of the waveguide over the screen 705. And the light travels through waveguide path until the light is tapped by a waveguide coupler 711. The light is detected by one of a photo-detector 713-1~N, and processed by an interface 714 to obtain an output signal which is referential to the input signal of the interactive signal 706. Wherein N is an integer greater than 1. The output signal of an interactive signal 715 referential to the input signal of the interactive signal 706 will be processed by further circuit such as central processing unit linked to an optical communication network. Conversely, an input signal of the interactive signal 715, the interface 714 modulates a light source 712-1~M. Wherein M is an integer greater than 1. A light emitted from a light source 712-1~M is transmitted through the waveguide 704 by the waveguide coupler 711. At the other waveguide ends aligned over the screen 705, the light enters the connected waveguide inside of the pen-shaped handle 710. Then the light is detected by a photo-detector 709, and processed by the interface 707 to obtain an output signal which is referential to the input signal of the interactive signal 715. An output signal of the interactive signal 706 referential to the input signal of the interactive signal 715 will be processed by further circuit such as a central processing unit.

In this particular structure described in FIG. 7, it is capable to transmit complicated command as an optical signal, not only recognize the location of the pen. Compare with the touch-screen system of the prior art, this present invention provide a display system which is able to transmit vast amount of signal interactively.

Figure 8:
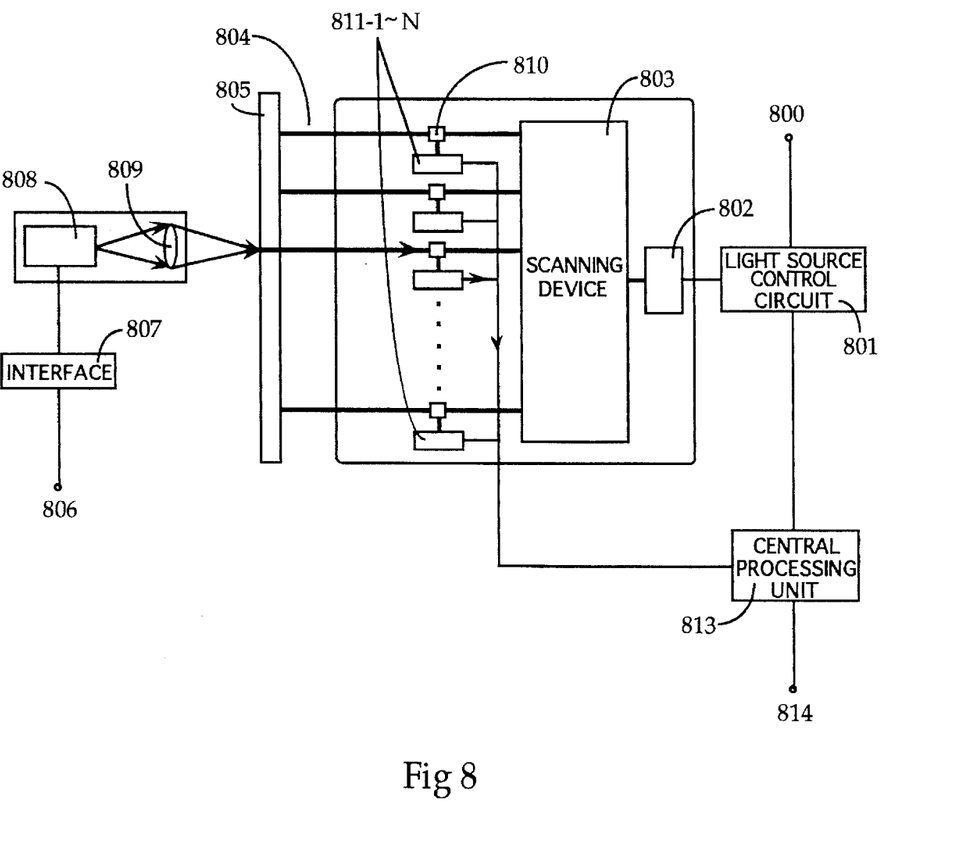
FIG. 8 shows schematic diagram of a laser scanning apparatus with optical signal input components for an FIG. 9 shows schematic diagram of a laser scanning apparatus with optical sensing components for an another application as an interactive display system of the present invention.

FIG. 8 shows schematic diagram of a laser scanning apparatus with optical signal input components for an another application as an interactive display system of the present invention. Associated with a video signal 800, a light source control circuit 801 modulates a light source 802. Lights emitted from the light source 802 are scanned by a scanning device 803 which is driven by a scanning device driver incorporated with a sweep signal, and the scanned lights are transmitted into a waveguide 804, then the light travel through the waveguide 804. At the other waveguide ends aligned over a screen 805, the scanned lights emanated at each of the waveguide end create a picture according to the video signal 800.

Associated with an input signal 806, an interface 807 modulates a light source 808. A light emitted from the light source 808 is collimated by a lens 809 and enters the other end of the waveguide over the screen 805, and travels through waveguide 804 until the light is tapped by a waveguide coupler 810. The light is detected by photo-detector 811-1~N, and processed by the interface 812 to obtain an output signal which is referential to the input signal 806. Wherein N is an integer greater than 1. The output signal referential to the input signal 806 is processed by a CPU (central processing unit) 813 to send an output signal 814 to a further circuit such as an interface linked to an optical communication network, or drive the light source control circuit 801 to control the picture displaying status.

Figure 9:
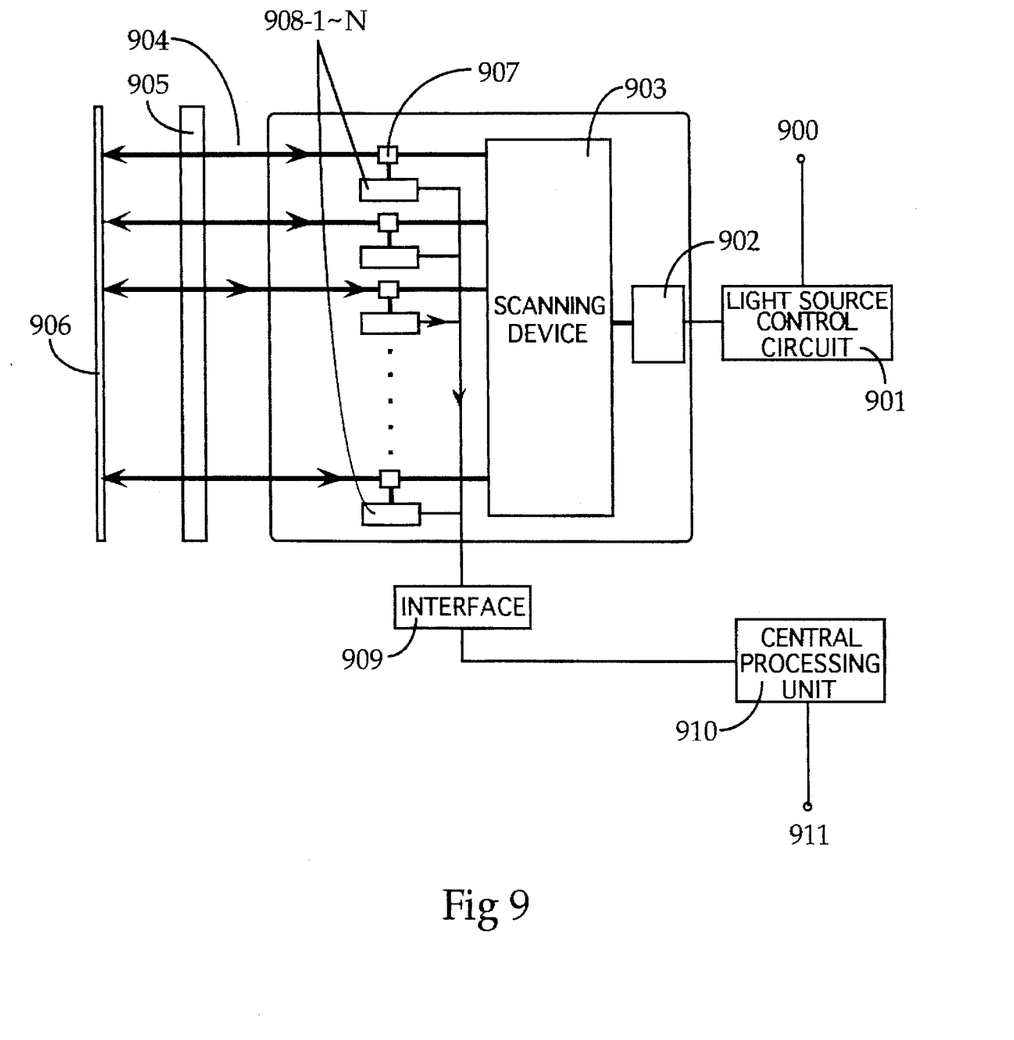

FIG. 9 shows schematic diagram of a laser scanning apparatus with optical sensing components for an another practical application as an interactive display system of the present invention. Associated with a video signal 900, a light source control circuit 901 modulates a light source 902. Light emitted from the light source 902 are scanned by a scanning device 903 which is driven by a scanning device driver incorporated with a sweep signal, and the scanned lights are transmitted into a waveguide 904, then the light travels through the waveguide 904. At the other waveguide ends aligned over a screen 905, the scanned lights emanated at each of the waveguide end create a picture according to the video signal 900.

The light source also emits invisible light which does not interfere the lights emitted to create a picture. The invisible light is a reference light to sense a medium 906. The transmitted reference light is reflected on the medium 906, and enters the another end of the waveguide over the screen 905, and travels through the waveguide 904 until the reflected reference light is tapped by a waveguide coupler 907. The reflected reference light is detected by photo-detectors 908-1~N, and each of the output signal from photo-detectors 908-1~N is processed by an interface 909 to obtain a reference signal which is referential to the medium 906. Wherein N is an integer greater than 1. The reference signal is processed by a CPU 910 to send an output signal 911 to a further component such as a printer or an information storage device.

Figure 10:
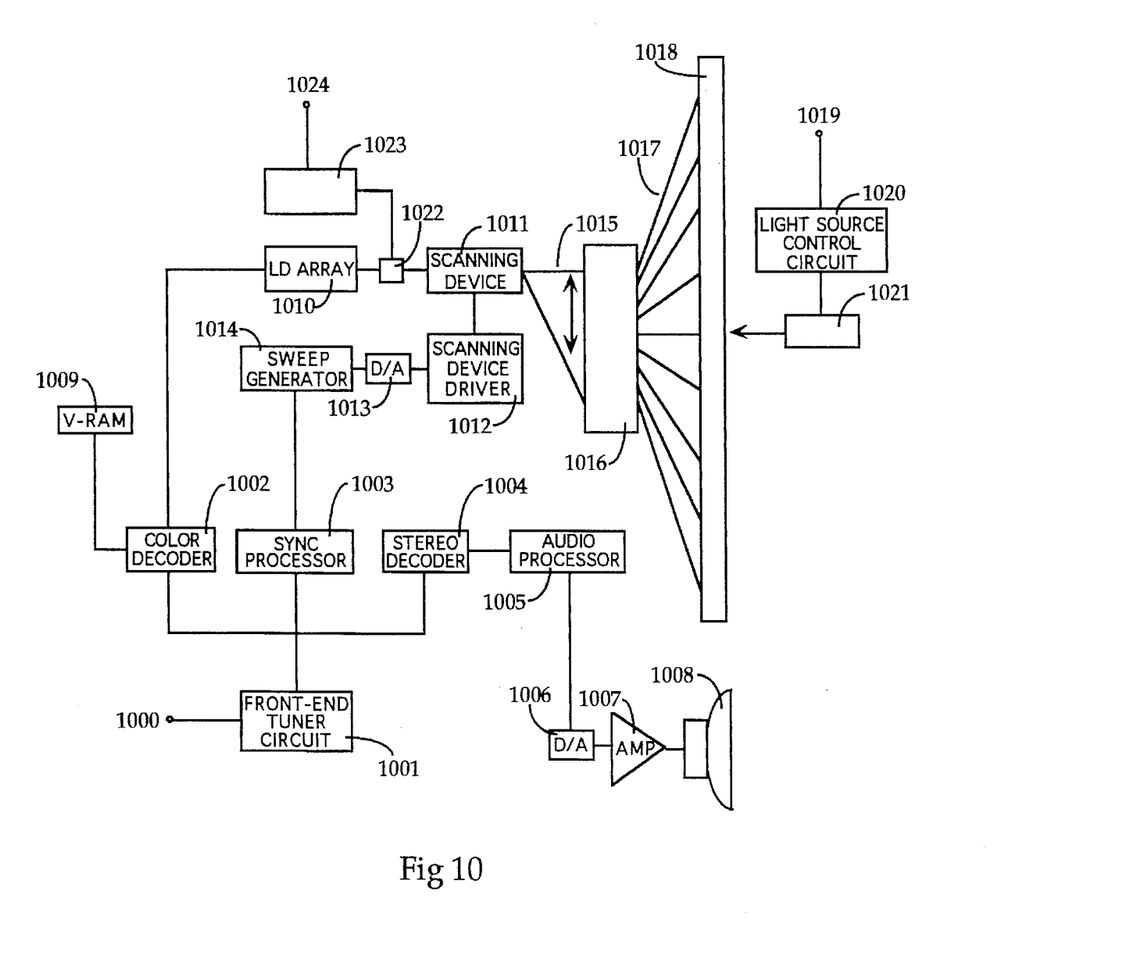
FIG. 10 shows schematic diagram of a laser scanning apparatus of the present invention, with digital receiving and operating circuits for an application as a television system.

FIG. 10 shows schematic diagram of a laser scanning apparatus of the present invention, with digital receiving and operating circuits for a practical application as a television system. The display system comprised of digital receiving circuit may be required to link with a digital optical fiber network.

Associated with a digital television signal 1000, a digital front-end tuner circuit 1001 delivers a digital video signal to a color decoder 1002, a digital sweep signal to a synchronizing processor 1003 and a digital audio signal to a stereo decoder 1004. The digital audio signal is processed by an audio processor 1005, then converted from digital to analog signal by a digital-to-analog (D/A) converter 1006. An audio amplifier 1007 amplifies the analog signal to reproduce the audio signal by a set of speaker 1008 according to the digital television signal 1000. According to the digital video signal, the color decoder 1002 accesses to a V-RAM 1009 to pick out a certain combination of voltage levels for laser diodes which emit three primary colors. The V-RAM contains values for possible colors needed to create a color of a single pixel. Then, the color decoder 1002 modulates each laser diode in a laser diode array 1010 which emits mixed three primary colors. Laser beams emitted from the laser diode array 1010 are scanned by a scanning device 1011 which is driven by a scanning device driver 1012 incorporated with the sweep generator 1014. The digital sweep signal is converted from digital to analog by a digital-to-analog (D/A) converter 1013 to operate the scanning device driver 1012. The scanned laser beams 1015 are transmitted into a waveguide coupler 1016. Aligned waveguide ends at the waveguide coupler 1016 receive the laser beams, then the laser beams travel through a waveguide 1017. At the other waveguide ends aligned over a screen 1018, the scanned laser beams emanated at each of the waveguide end create a picture according to the television signal 1000.

Associated with an input signal 1019, a light source control circuit 1020 modulates a light source 1021. A light emitted from the light source 1021 enters the other end of the waveguide over the screen 1018, and travels through waveguide path until the light is tapped by a waveguide coupler 1022. The light is detected by a photo-detector 1023, and an output signal 1024 which is referential to the input signal 1019 will be processed by further circuit such as a central processing unit.

Figure 11:
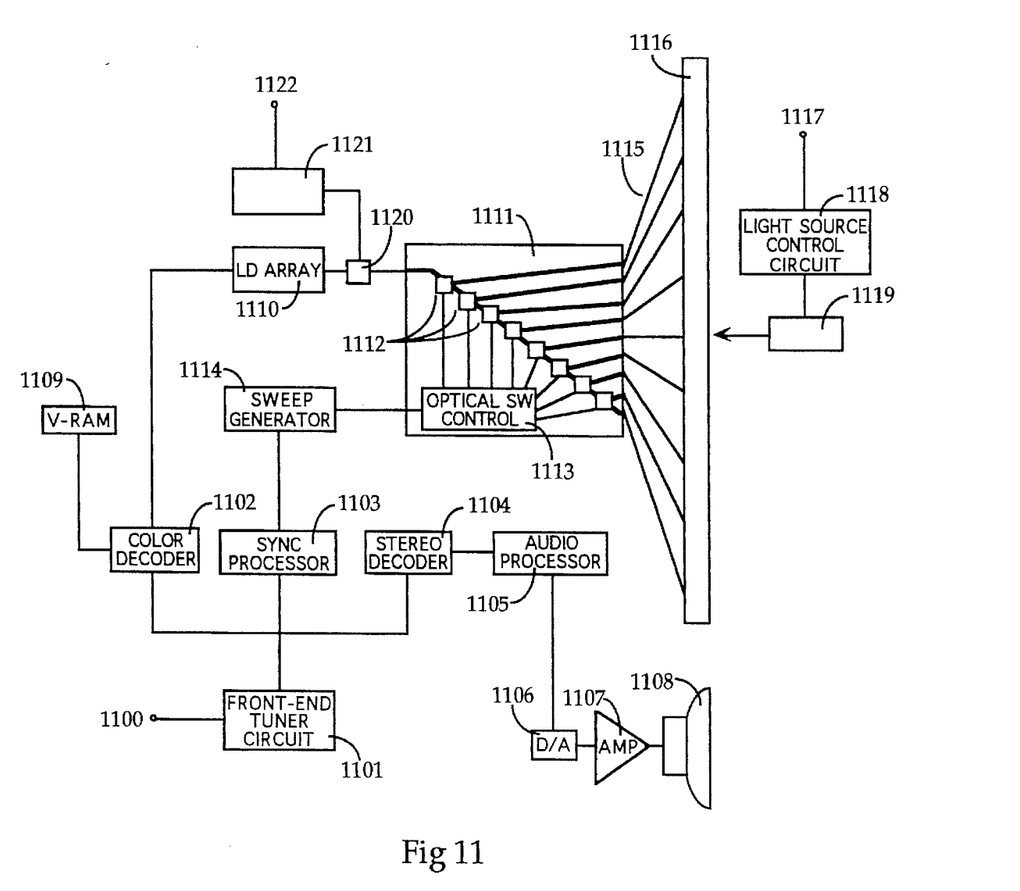
FIG. 11 shows schematic diagram of a laser scanning apparatus of the present invention, with digital receiving and operating circuits for an another application as a television system.

FIG. 11 shows schematic diagram of a laser scanning apparatus of the present invention, with digital receiving and operating circuits for a practical application as a television system. Associated with a digital television signal 1100, a digital front-end tuner circuit 1101 delivers a digital video signal to a color decoder 1102, a digital sweep signal to a synchronizing processor 1103 and a digital audio signal to a stereo decoder 1104. The digital audio signal is processed by an audio processor 1105, then converted from digital to analog signal by a digital-to-analog (D/A) converter 1106. An audio amplifier 1107 amplifies the analog signal to reproduce the audio signal by a set of speaker 1108 according to the digital television signal 1100. According to the digital video signal, the color decoder 1102 accesses to a V-RAM 1109 to pick out a certain combination of voltage levels for laser diodes which emit three primary colors. The V-RAM contains values for possible colors needed to create a color of a single pixel. Then, the color decoder 1102 modulates each laser diode in a laser diode array 1110 which emits mixed three primary colors. Laser beams emitted from the laser diode array 1110 enter a waveguide on an integrated optical switch circuit 1111. The laser beams emitted from the laser diode array 1110 travel through the waveguide. Then, at one of an optical switch 1112, the laser beam are switched into a ramified waveguide. Each of the optical switch is driven by an optical switch control circuit 1113 incorporated with a sweep generator 1114. Only where the optical switch is "ON" the laser beams are deflected to the linked waveguide path. By intermittently turning on and off the optical switch 1112 by the optical switch control circuit 1113, the laser beams are swept into each linked waveguide path. The swept laser beams are transmitted into a waveguide 1115. Aligned waveguide ends of the waveguide 1115 receive the laser beams, then the laser beams travel through the waveguide 1115. At the other waveguide ends aligned over a screen 1116, the swept laser beams emanated at each of the waveguide end create a picture according to the television signal 1100.

Associated with an input signal 1117, a light source control circuit 1118 modulates a light source 1119. A light emitted from the light source 1119 enters the other end of the waveguide over the screen 1116, and travels through waveguide path until the light is tapped by a waveguide coupler 1120. The light is detected by a photo-detector 1121, and an output signal 1122 which is referential to the input signal 1117 will be processed by further circuit such as a central processing unit.

Although the invention has been particularly shown and described, it is contemplated that various changes and modification may be made without departing from the scope of the invention as set forth in the following claims.

What is claimed is:

1. A laser scanning apparatus comprising in combination:

a light source;

a light source control circuit which modulates the light source according to a digital or analog video signal;

a light scanning means which scans a light emitted from the light source;

a light scanning means driver which controls the light scanning means according to a digital or analog sweep signal;

a waveguide bundle whereof one end of a waveguide is aligned to receive a scanned light and to transmit the scanned light to the other end of the waveguide;

a first infrared light source;

a first photo-detector;

a first interface which modulates the first infrared light source according to an input signal, and converts an output signal from the first photo-detector to a central processing unit;

a second infrared light source which transmits an optical signal to the first photo-detector;

a second photo-detector which receives the light emitted from the first infrared light source, or a reflected infrared light which enters into the other end of the waveguide;

a second interface which modulates the second infrared light source according to an input signal, and converts an output signal from the second photo-detector to a central processing unit; and an optical coupler which taps the infrared light entering into the other end of the waveguide or the reflected infrared light entering into the other end of the waveguide, and transmits the infrared light emitted from the second infrared light source into said waveguide bundle.

2. The apparatus of claim 1, wherein said light source is a set of laser diodes each of which emit one color of three primary colors at a selective level of intensity according to a digital or analog video signal.

3. The apparatus of claim 1, wherein said light scanning means is a moving mirror cooperating with a moving mirror driver for said light scanning means driver.

4. The apparatus of claim 1, wherein said light scanning means is an acousto-optic deflector cooperating with an acousto-optic deflector driver for said light scanning means driver.

5. The apparatus of claim 1, wherein said light scanning means is an optical switch array cooperating with an optical switch control circuit for said light scanning means driver.

6. The apparatus of claim 5, wherein said light source is a set of light emitting diodes each of which emit one color of three primary colors at a selective level of intensity according to a digital or analog video signal.

7. The apparatus of claim 1, further including a front-end tuner circuit which receives the digital or analog video signal, a video circuit cooperating with said light source control circuit, a sweep circuit cooperating with said light scanning means driver, and an audio circuit cooperating with a speaker.

8. The apparatus of claim 1, wherein said first infrared light source, said first photo-detector and said first interface are located on the other end of the waveguide, and said first infrared light source transmits the infrared light into the other end of the waveguide, and by way of said optical coupler said first photo-detector receives the infrared light emitted on the other end of the waveguide.

9. The apparatus of claim 1, wherein said second infrared light source, said second photo-detector and said second interface are connected by way of said optical coupler which taps the infrared light traveling through said waveguide bundle, and said optical coupler transmits the infrared light from said second infrared light source into the waveguide bundle, and said second photo-detector receives the infrared light emitted from said first infrared light source or the reflected infrared light entering into the other end of the waveguide.

10. the apparatus of claim 1, further including a lens which collimates the infrared light emitted from said first infrared light source to transmit the infrared light into the other end of the waveguide.

11. A laser scanning apparatus comprising in combination:

a laser source;

a laser source control circuit which modulates the laser source according to a digital or analog video signal;

a laser scanning means which scans a laser emitted from the laser source;

a laser scanning means driver which controls the laser scanning means according to a digital or analog sweep signal;

a waveguide bundle whereof one end of a waveguide is aligned to receive a scanned laser and to transmit the scanned laser to the other end of the waveguide;

a phosphor coating screen whereof each phosphor is aligned to be struck by the laser emanated from the other end of the waveguide;

a first infrared light source;

a first photo-detector;

a first interface which modulates the first infrared light source according to an input signal, and converts an output signal from the first photo-detector to a central processing unit;

a second infrared light source which transmits an optical signal to the first photo-detector;

a second photo-detector which receives the infrared light emitted from the first infrared light source;

a second interface which modulates the second infrared light source according to an input signal, and converts an output signal from the second photo-detector to a central processing unit; and an optical coupler which taps the infrared light entering into the other end of the waveguide, and transmits the infrared light emitted from the second infrared light source into said waveguide bundle.

12. The apparatus of claim 11, wherein one pixel of said phosphor coating screen is comprised of a set of a phosphor which illuminates red, green and blue at a selective level of intensity by the laser striking at a selective level of intensity according to a digital or analog video signal.

13. The apparatus of claim 11, wherein said laser scanning means is a moving mirror with a moving mirror driver for said laser scanning means driver.

14. The apparatus of claim 11, wherein said laser scanning means is an optical switch array cooperating with an optical switch control circuit for said laser scanning means driver.

15. The apparatus of claim 11, further including a front-end tuner circuit which receives the digital or analog video signal, a video circuit cooperating with said laser source control circuit, a sweep circuit cooperating with said laser scanning means driver, and an audio circuit cooperating with a speaker.

16. The apparatus of claim 11, wherein said first infrared light source, said first photo-detector and said first interface are located on said phosphor coating screen, and said first infrared light source transmits the infrared light into the other end of the waveguide by passing through said phosphor coating screen, and said first photo-detector receives the infrared light emitted on the other end of the waveguide.

17. The apparatus of claim 11, wherein said second infrared light source, said second photo-detector and said second interface are connected by way of said optical coupler which taps the light traveling through said waveguide bundle, and said optical coupler transmits the infrared light from said second infrared light source into the waveguide bundle, and by way of said optical coupler said second photo-detector receives the infrared light emitted from said first infrared light source.

18. the apparatus of claim 11, further including a lens which collimates the infrared light emitted from said first infrared light source to transmit into the other end of the waveguide by passing through said phosphor coating screen.

* * * * *